July 26, 1960 F. E. WOOD 2,946,856

TELEPHONE EXCLUSION KEY

Filed May 28, 1958 2 Sheets-Sheet 1

INVENTOR.
Fredric E. Wood
BY C. R. Sipe
Atty.

July 26, 1960 F. E. WOOD 2,946,856

TELEPHONE EXCLUSION KEY

Filed May 28, 1958 2 Sheets-Sheet 2

Inventor
Fredric E. Wood
C. R. Sijse
Atty.

United States Patent Office 2,946,856

Patented July 26, 1960

2,946,856

TELEPHONE EXCLUSION KEY

Fredric E. Wood, McHenry, Ill., assignor to Automatic Electric Laboratories, Inc., a corporation of Delaware Filed May 28, 1958, Ser. No. 738,476

6 Claims. (Cl. 179—99)

This invention relates to telephone substation apparatus and more particularly to an exclusion feature for use in telephone instruments.

The exclusion apparatus as shown herein is adapted for use with a telephone hookswitch assembly of the type shown in United States Patent 2,810,792 issued October 22, 1957 to R. L. Sargisson et al. The arrangement shown herein is actuated by two separate plungers in the handset cradle. One plunger is used as the exclusion button, the other the release button. These plungers operate independently of the hookswitch plungers generally, except that release of the hookswitch plungers releases the exclusion button.

An exclusion feature is provided for telephone lines which are equipped with an extension telephone. The principal instrument on the line for example, could be that of an executive and the extension that of his secretary. When a call has been initiated or answered, the executive may desire to exclude the extension from the line. He then depresses the extension button and continues his call in privacy. If he wishes to return the extension to the line, he depresses the release button. In any event, when the call is completed and the handset is replaced in the cradle, it is necessary that the extension be returned to the line in order that the secretary be able to answer further incoming calls. To further this end, it is required that replacement of the handset release the exclusion and return the extension to the line.

The use of exclusion in conjunction with the plungers of a telephone set is shown in United States Patent 2,546,070 issued March 20, 1951 to O. W. Henrikson et al. In this reference, the exclusion feature is performed by one of the hookswitch plungers and a release lever is provided to release the exclusion and return the excluded instrument to its normal status as an extension telephone.

An object of the present invention is to provide a new and improved exclusion arrangement for use in a telephone desk stand.

Another object of the invention consists in the use of two plungers in the handset cradle of the telephone in addition to the normal hookswitch plungers. These plungers, one an extension exclusion button and the other a release button, operate, in the main, independently of the operation of the hookswitch plungers.

A feature of the invention resides in the use of a Y-shaped pivotable member within the casing of the desk set; the two upper arms of the Y member each responsive to motion by a separate one of the exclusion arrangement buttons, the arms of the Y and the plungers mutually reciprocable in effect. The single lower leg of the Y member is adapted to operate a spring pileup in the desk set base.

A further feature of the invention consists of the use of a cam or extension on the hookswitch pileup actuating bar which automatically returns the extension plunger to normal when the telephone handset is replaced in the cradle of the desk stand.

Figure 1:
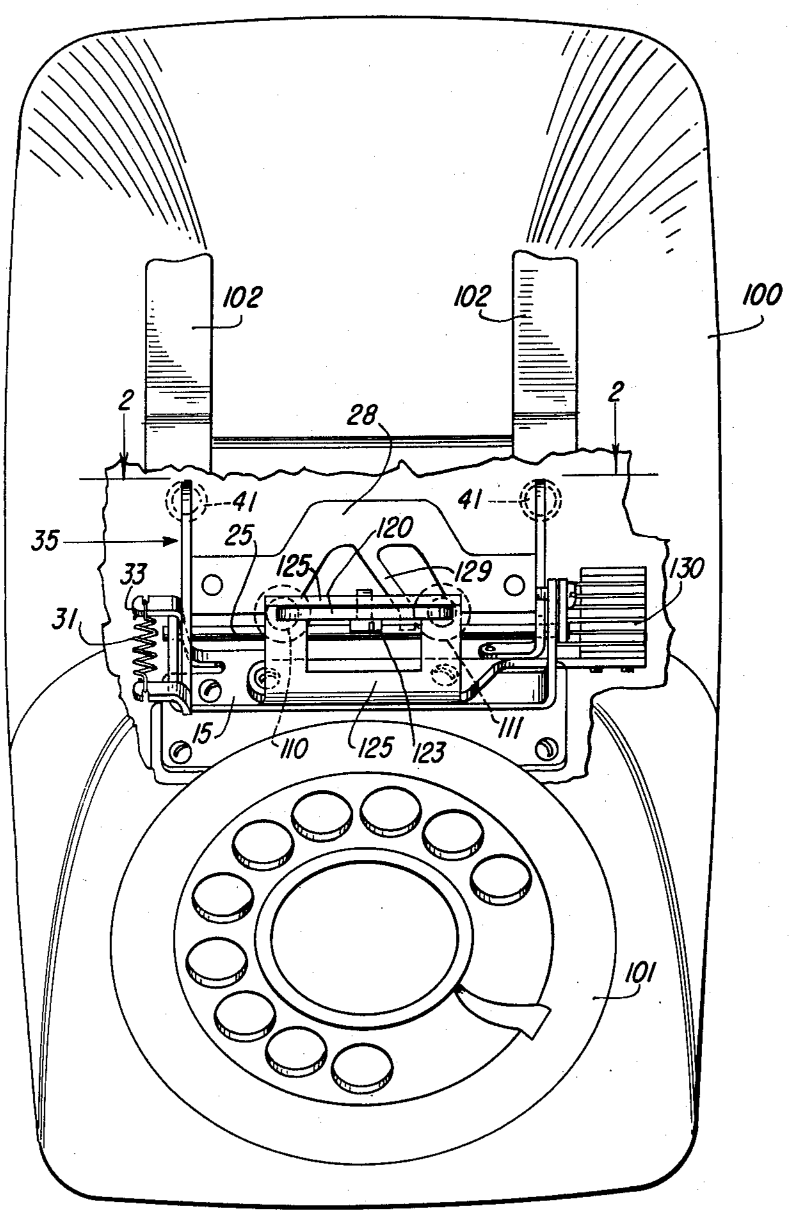
Fig. 1 shows a top view of the telephone desk stand as viewed from the front of the set with a cutout section showing the hookswitch apparatus.

As mentioned, the exclusion arrangement disclosed herein is adapted for use with a hookswitch of the type shown in the cited Sargisson patent. For ease of explanation, reference characters in applicant's disclosure, wherever possible, are the same as those shown for the comparable part in the Sargisson patent.

In general then, the present invention is designed for use in a telephone desk stand in which two hookswitch plungers 41 are mounted between the tines 102 of a handset cradle. These plungers act jointly and, on depression, drive release lever arm 35 downward releasing spring pileup 16. The present invention differs from the cited patent in that hookswitch lever 28 has an added cam or extension 129 shown in detail in Figs. 1 and 2.

Figure 2:
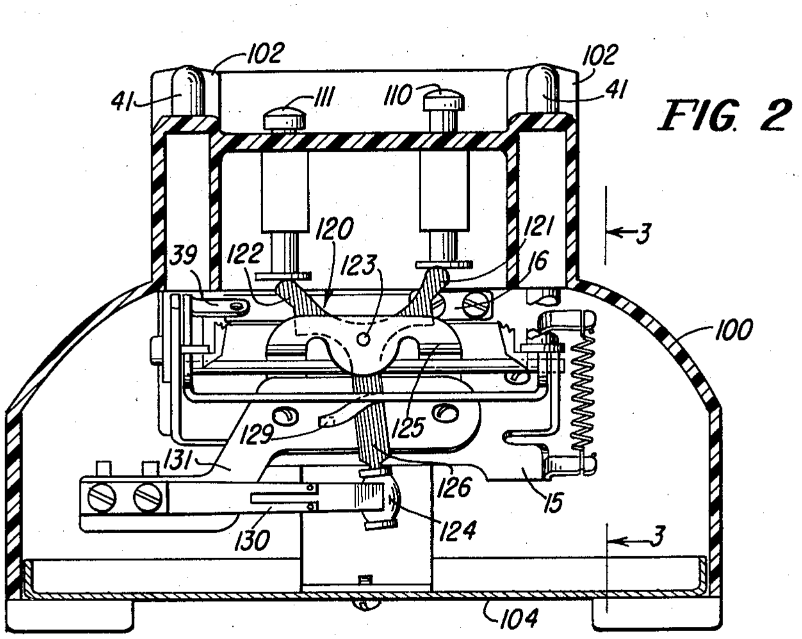
Fig. 2 is a cross section of the desk stand from the rear.
Figure 3:
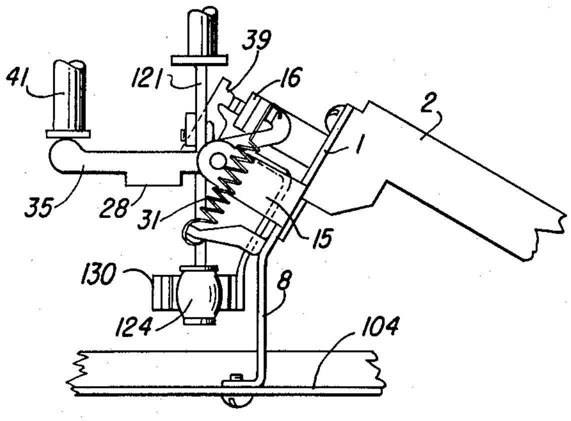
Fig. 3 is a right side view of the actuating members of the hookswitch and exclusion arrangement.

The present invention also differs in that it adds to the hookswitch assembly a main mounting bracket 125 which, along with spring bracket 131, are firmly affixed to the dial mounting base 1 shown in detail in Figs. 1 and 2 of Sargisson. The bracket 125 has a tapped hole substantially centrally in the bracket through which pivot screw 123 is mounted. This pivot screw 123 is used to secure the Y shaped lever member 120 to the bracket 125. The Y bracket has two upper arms 121 and 122 and a lower leg 126. The lower leg 126 has a fiber plastic insulating bushing 124 of generally ovoid shape at its outer end. A spring pileup 130 is mounted on spring bracket 131 in such a way that the pileup will be operated by motion of the ovoid buffer.

Each of the upper arms 121 and 122 of the Y bracket 120 have poised above them respectively plungers or buttons 110 and 111. These plungers are mounted midway between the tines 102 and substantially centrally in the cradle of the desk stand base.

When the exclusion feature is to be used, the telephone instrument is in use with the handset out of the cradle and plungers 41 in their released or up position. The extension telephone which is required to be disconnected from the line of the telephone shown would be connected to the terminals of exclusion spring pileup 130.

The operation is as follows: exclusion plunger 110 is depressed manually. Upper arm 121 follows the motion of the plunger 110 and tends to move downward about its pivot screw 123. Lower arm 126 is moved toward the exclusion pileup 130 and the buffer enters the pileup and opens or closes the required contacts. The specific circuitry of this extension telephone connection may be of any of the generally known and used methods. The travel of lower leg 126 is stopped by contact with hookswitch cam 129 which defines the end of the Y member lower arm travel path. Once the Y bracket 120 has operated the springs of the spring pileup, the pileup remains operated by the buffer thus excluding the extension telephone until the exclusion button positively releases.

Release may occur in two possible ways. The first method of release is by the use of release button 111. Depression of the release button depresses upper arm 122 of the Y bracket which causes the other upper arm 121 to assume a higher relative position restoring plunger 110 to its normal position. Lower leg 126 is withdrawn from the spring pileup to the extent that buffer 124 does not contact the exclusion springs of pileup 130. The bracket, once it has been restored, remains in the restored position. The restored position is the one shown in Figs. 1 and 2.

The second method of restoring the exclusion button once it has been operated is accomplished by means of the hookswitch plungers. Normally, this will occur when the handset is replaced in the cradle since the main reason for having an extension is that a call may be answered from any one of the handsets.

Restoration of the handset depresses plungers 41 which force their lever followers 35 to depress, pivoting hookswitch lever 28 about its shaft 25. The eccentric cam or extension 129 in the operated position of the exclusion arrangement is in contact with the lower leg 126 of the Y bracket as mentioned previously. The cam responds to the pivoting of lever 28 forcing the lower leg 126 to the right (as shown in Fig. 2) removing the buffer 124 from contact with pileup 130 and thus restoring the exclusion arrangement to normal.

What is claimed is:

1. In a telephone substation unit comprising a base having a plurality of tines protruding from said base, each two of said tines forming a set, a cradle defined in the upper portion of said base by said tines, an exclusion plunger in said cradle, a release plunger mutually reciprocable with said exclusion plunger, a Y-shaped member mounted internally in said base and having a first arm subjacent said exclusion plunger, a second arm subjacent said release plunger and a leg extending downwardly, a spring pileup adjacent said leg, said leg responsive to rotation of said first arm by the depression of said exclusion plunger to operate said spring pileup, and said second arm responsive to said rotation to prepare said release plunger for subsequent operations.

2. In a substation unit as claimed in claim 1, each of said tine sets containing a vertically movable plunger, said tine set plungers coupled for joint vertical motion, means controlled by the depression of said tine set plungers for moving the leg of said Y member away from said spring pileup to release said pileup.

3. In a telephone desk set comprising a main base unit having a cradle for resting therein a handset, a first pair of plungers in said cradle jointly controlled by the removal of said handset from said cradle to release a first spring pileup, a second pair of plungers in said cradle for controlling the operation of a second spring pileup, said second pair of plungers comprising an exclusion plunger and a release plunger, an operating member responsive to depression of said exclusion plunger to operate said second spring pileup, said operating member responsive to depression of said release plunger and also responsive to depression of said first pair of plungers to release said second pileup from operation.

4. In a desk mounting for a telephone handset, said mounting having a plurality of plungers extending from the upper surface of said mounting, a first set of said plungers having a hookswitch thereunder pivotable on vertical motion of said first set of plungers jointly, a first spring pileup operatively responsive to the pivoting of said hookswitch, a second set of plungers comprising an exclusion plunger and a release plunger, a Y-shaped member pivoted substantially centrally and having a first and second arm and a downwardly extending leg, a second spring pileup independent of said first pileup, each of said arms of said member mutually reciprocable about the central pivot responsive to depression of one of the plungers of said second set, said leg rotated to operate said second pileup in response to depression of said exclusion plunger, an extension cam on said pivotable hookswitch positioned to pivot said leg of said Y member to release said second pileup on depression of said first set of plungers.

5. In a desk type telephone including a base, a handset, a pair of tines protruding from the base for receiving the handset, a hookswitch in the base including a spring pileup, a plunger in said tines operated by placement of said handset thereon for actuating said hookswitch spring means urging said plunger upwards in response to removal of the handset from said tines, exclusion springs operable only when said handset is removed from said tines, an exclusion plunger in said base remote from said tines, a Y member pivoted in a first direction responsive to the manual depression of said exclusion plunger to operate said exclusion springs, a cam on said hookswitch operated by placement of said handset in said tines to pivot said Y member in a second direction to simultaneously release said exclusion springs and elevate said exclusion plunger.

6. In a telephone set as claimed in claim 5, an alternate exclusion springs release mechanism operable only when said handset is out of said tines, said alternate release mechanism comprising a release plunger in said base remote from said tines to pivot said member in said second direction and also cause said exclusion plunger to be elevated.

References Cited in the file of this patent

UNITED STATES PATENTS

| | | |
|---|---|---|
| 2,212,216 | Tradup | Aug. 20, 1940 |
| 2,218,328 | Curran et al. | Oct. 15, 1940 |
| 2,234,650 | Obergfell | Mar. 11, 1941 |
| 2,273,530 | King | Feb. 17, 1942 |
| 2,351,459 | Shann | June 13, 1944 |